United States Patent
Baldysiak et al.

(10) Patent No.: US 10,936,201 B2
(45) Date of Patent: Mar. 2, 2021

(54) LOW LATENCY MIRRORED RAID WITH PERSISTENT CACHE

(71) Applicant: Intel Corporation, Santa Clara, CA (US)

(72) Inventors: Pawel Baldysiak, Banino (PL); Piotr Wysocki, Gdansk (PL); Slawomir Ptak, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 47 days.

(21) Appl. No.: 16/281,896

(22) Filed: Feb. 21, 2019

(65) Prior Publication Data

US 2019/0187917 A1   Jun. 20, 2019

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/0888* | (2016.01) |
| *G06F 12/0866* | (2016.01) |
| *G06F 12/0804* | (2016.01) |
| *G06F 11/16* | (2006.01) |
| *G06F 11/20* | (2006.01) |

(52) U.S. Cl.
CPC ............ *G06F 3/0611* (2013.01); *G06F 3/065* (2013.01); *G06F 3/0634* (2013.01); *G06F 3/0659* (2013.01); *G06F 3/0689* (2013.01); *G06F 12/0804* (2013.01); *G06F 12/0866* (2013.01); *G06F 12/0888* (2013.01); *G06F 11/1612* (2013.01); *G06F 11/1666* (2013.01); *G06F 11/2089* (2013.01); *G06F 11/2094* (2013.01); *G06F 2212/1024* (2013.01);

(58) Field of Classification Search
CPC ............ G06F 11/1612; G06F 11/1666; G06F 11/2089; G06F 11/2094
USPC .......................................................... 711/114
See application file for complete search history.

(56) References Cited

U.S. PATENT DOCUMENTS

| | | | | |
|---|---|---|---|---|
| 2002/0156971 A1* | 10/2002 | Jones | ................... | G06F 11/2094 711/114 |
| 2014/0281272 A1* | 9/2014 | Loaiza | ................ | G06F 11/2058 711/144 |

(Continued)

OTHER PUBLICATIONS https://searchstorage.techtarget.com/definition/cache, What is cache (computing)? (Year: 2018).*

(Continued)

*Primary Examiner* — Edward J Dudek, Jr.
*Assistant Examiner* — Sidney Li
(74) *Attorney, Agent, or Firm* — Jordan IP Law, LLC

(57) ABSTRACT

An embodiment of a semiconductor apparatus for use with redundant storage may include technology to cache all data for a write request for at least two member persistent storage drives in a persistent cache with a write access latency at least as low as a lowest write access latency of the at least two member persistent storage drives, write the data for the write request to one member persistent storage drive of the at least two member persistent storage drives, and indicate that the write request is complete after the data for the write request is redundantly stored in the persistent cache and the one member persistent storage drive. Other embodiments are disclosed and claimed.

20 Claims, 8 Drawing Sheets

(56) References Cited

U.S. PATENT DOCUMENTS

2014/0359226 A1* 12/2014 Pan .................... G06F 12/0873
                                                      711/135
2017/0040379 A1*  2/2017 Sasago ............... G11C 13/0004

OTHER PUBLICATIONS

Wikipedia, "Non-standard RAID levels", <en.wikipedia.org/wiki/Non-standard_RAID_levels>, retrieved Jan. 25, 2019, 6 pages.

* cited by examiner

LOW LATENCY MIRRORED RAID WITH PERSISTENT CACHE

TECHNICAL FIELD

Embodiments generally relate to storage systems. More particularly, embodiments relate to low latency mirrored redundant array of independent disks (RAID) with persistent cache.

BACKGROUND

Some redundant storage systems may include RAID technology. RAID levels and data format standards are set by the Storage Networking Industry Association (SNIA). RAID 1 may utilize disk mirroring technology. RAID 10 (also referred to as RAID 1+0) may utilize both disk mirroring and disk striping technology.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NVM may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

Figure 1:
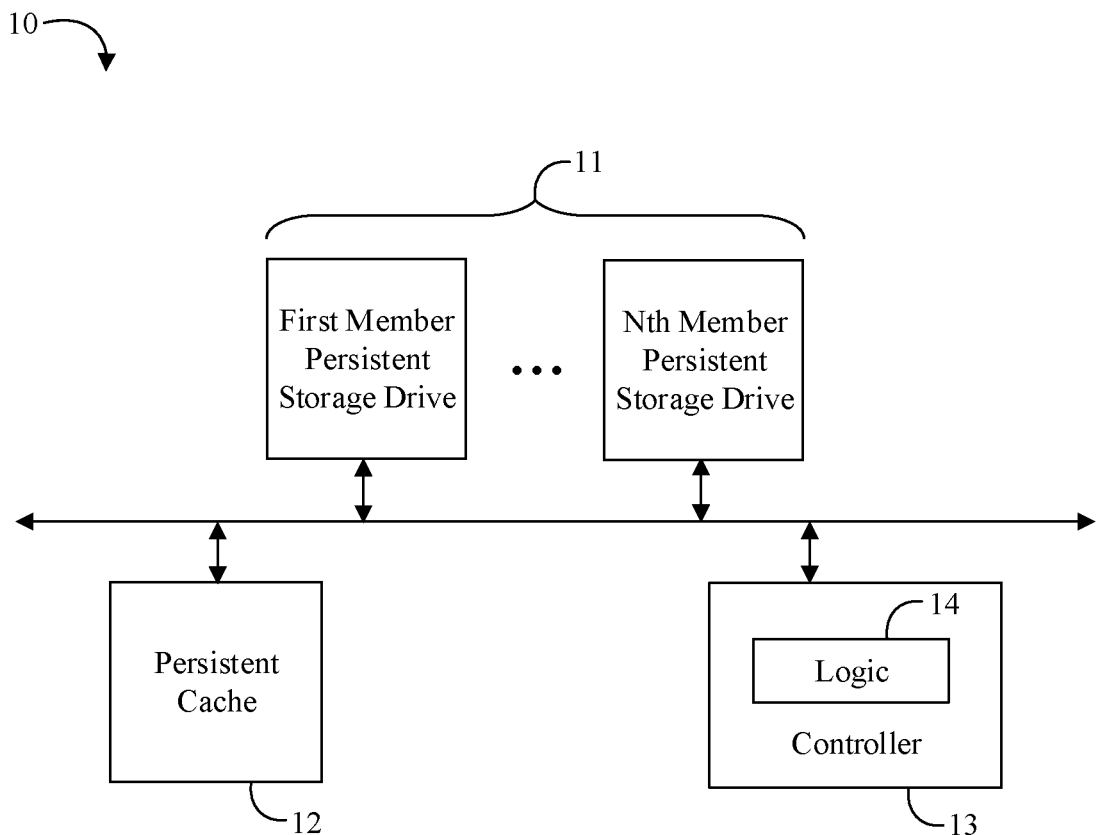
FIG. 1 is a block diagram of an example of an electronic redundant storage system according to an embodiment.

Turning now to FIG. 1, an embodiment of an electronic redundant storage system 10 may include at least two member persistent storage drives 11 (e.g., a first member drive through an Nth member drive, where N>1), persistent cache 12 communicatively coupled to the at least two member persistent storage drives 11, the persistent cache 12 with a write access latency at least as low as a lowest write access latency of the at least two member persistent storage drives 11, and a controller 13 communicatively coupled to the persistent cache 12 and the at least two member persistent storage drives 11. For example, the persistent cache 12 may include NVM, power backed-up volatile memory, etc. In some embodiments, the controller 13 may include logic 14 to cache all data for a write request for the at least two member persistent storage drives 11 in the persistent cache 12, write the data for the write request to one member persistent storage drive of the at least two member persistent storage drives 11, and indicate that the write request is complete after the data for the write request is redundantly stored in the persistent cache 12 and the one member persistent storage drive. For example, the logic 14 may be further configured to write the data for the write request to the one member persistent storage drive in a striped manner, and/or to set the persistent cache 12 in a write-through mode.

In some embodiments, the logic 14 may also be configured to determine if the at least two member persistent storage drives 11 are idle, and synchronize the data for the write request to another member persistent storage drive of the at least two member persistent storage drives 11 when the at least two member persistent storage drives 11 are determined to be idle. For example, the logic 14 may also be configured to determine if synchronization of the data for the write request is complete, and evict the data for the write request from the persistent cache 12 when the synchronization is determined to be complete. In some embodiments, the logic 14 may be further configured to bypass the persistent cache 12 if the persistent cache 12 cannot store all the data for the write request, and write the data for the write request to two or more member persistent storage drives of the at least two member persistent storage drives 11. In any of the embodiments herein, the persistent cache 12 may comprise PCM (e.g., INTEL 3D XPOINT memory, INTEL OPTANE technology, etc.). In some embodiments, the persistent cache 12 and/or the logic 14 may be located in, or co-located with, various components, including the controller 13 (e.g., on a same die).

Embodiments of each of the above member persistent storage drives 11, persistent cache 12, controller 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 13 may include a general purpose controller, a special purpose controller, a storage controller, a memory controller, a micro-controller, general purpose processor, a special purpose processor, a central processor unit (CPU), etc. Embodiments of a RAID controller may also be implemented as software RAID with RAID logic running on a host CPU.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, firmware memory, persistent storage media, or other system memory may store a set of instructions which when executed by the controller 13 cause the system 10 to implement one or more components, features, or aspects of the system 10 (e.g., the logic 14, caching all data for the write request in the persistent cache 12, writing the data for the write request to one member persistent storage drive, indicating that the write request is complete after the data for the write request is redundantly stored in the persistent cache 12 and the one member persistent storage drive, etc.).

Figure 2:
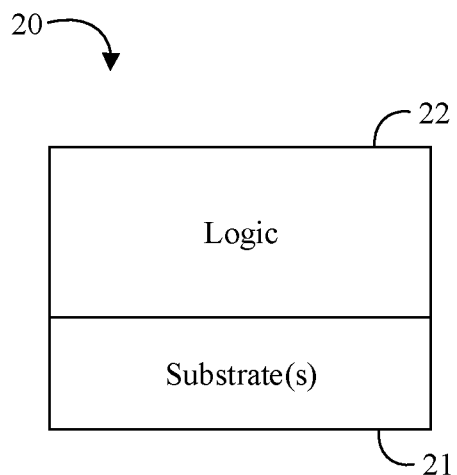
FIG. 2 is a block diagram of an example of a semiconductor apparatus according to an embodiment.
Figure 3A:
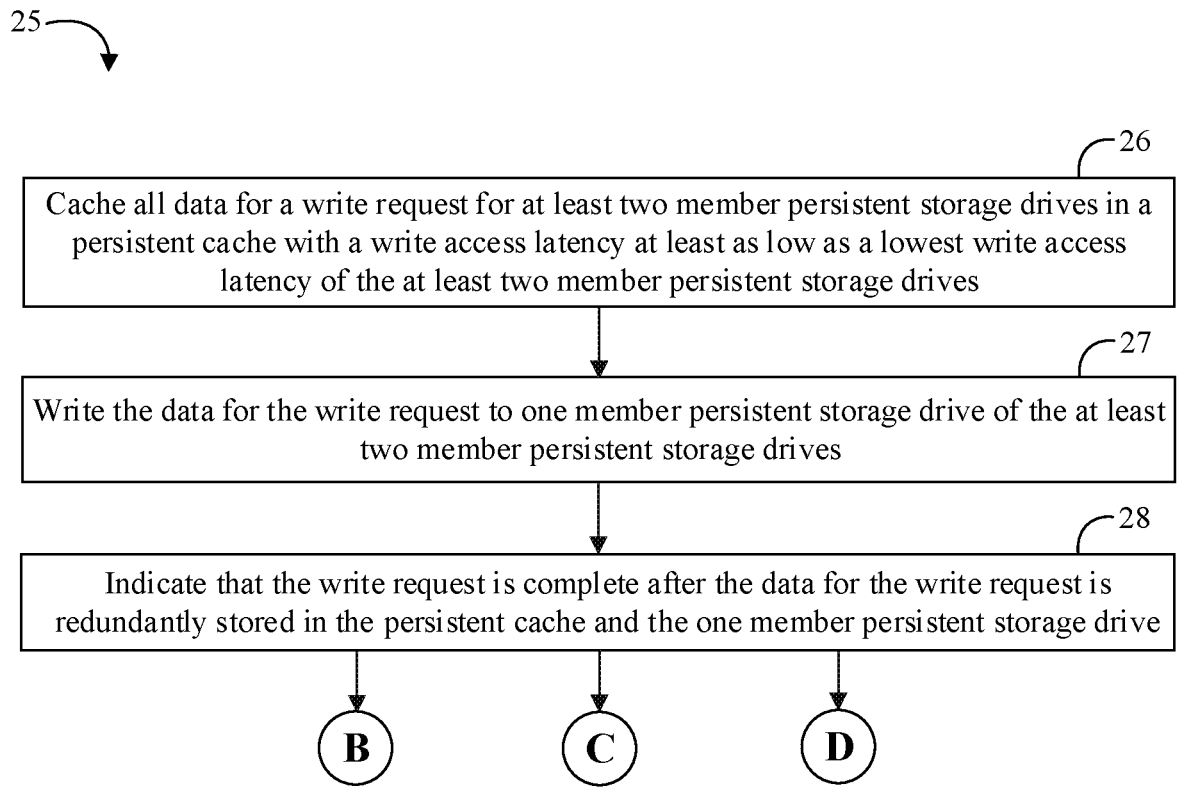
FIGS. 3A to 3D are flowcharts of an example of a method of controlling redundant storage according to an embodiment.
Figure 3B:
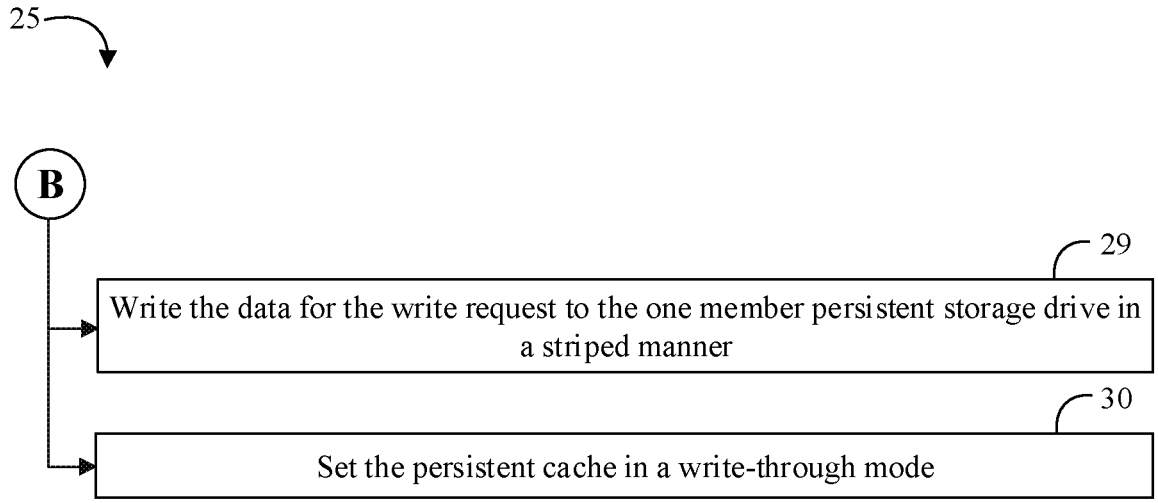
Figure 3C:
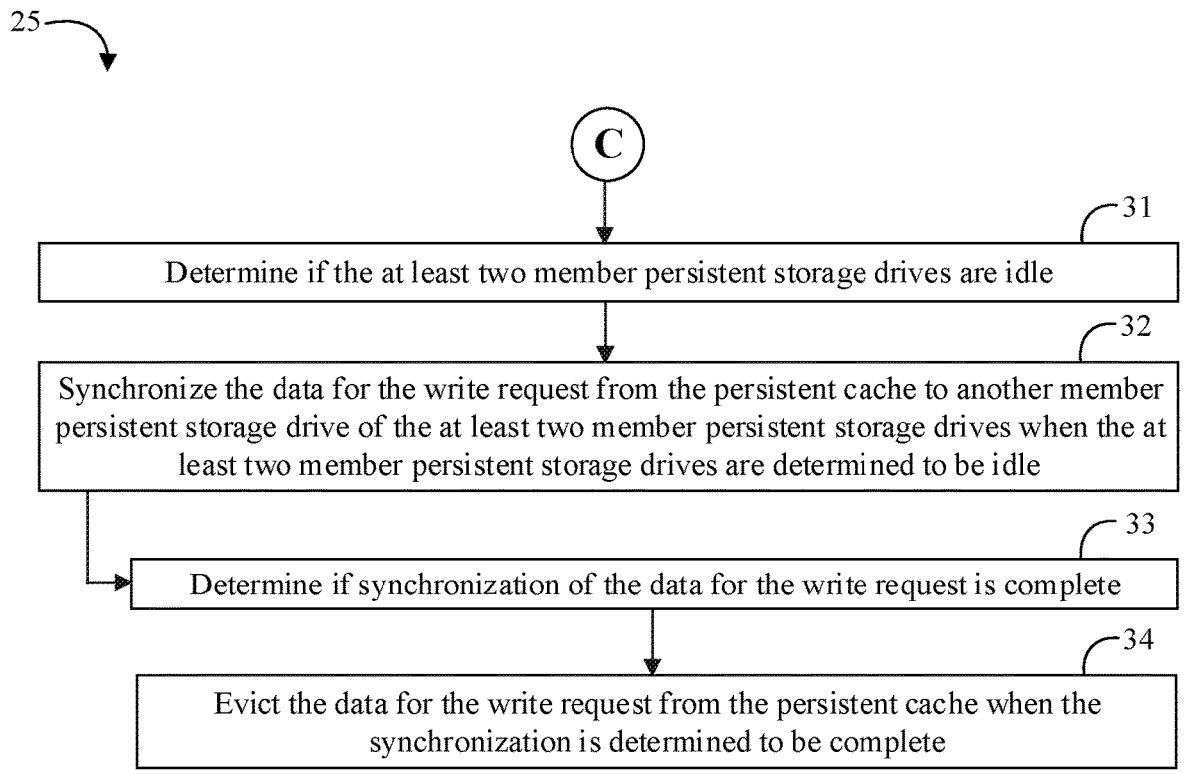
Figure 3D:
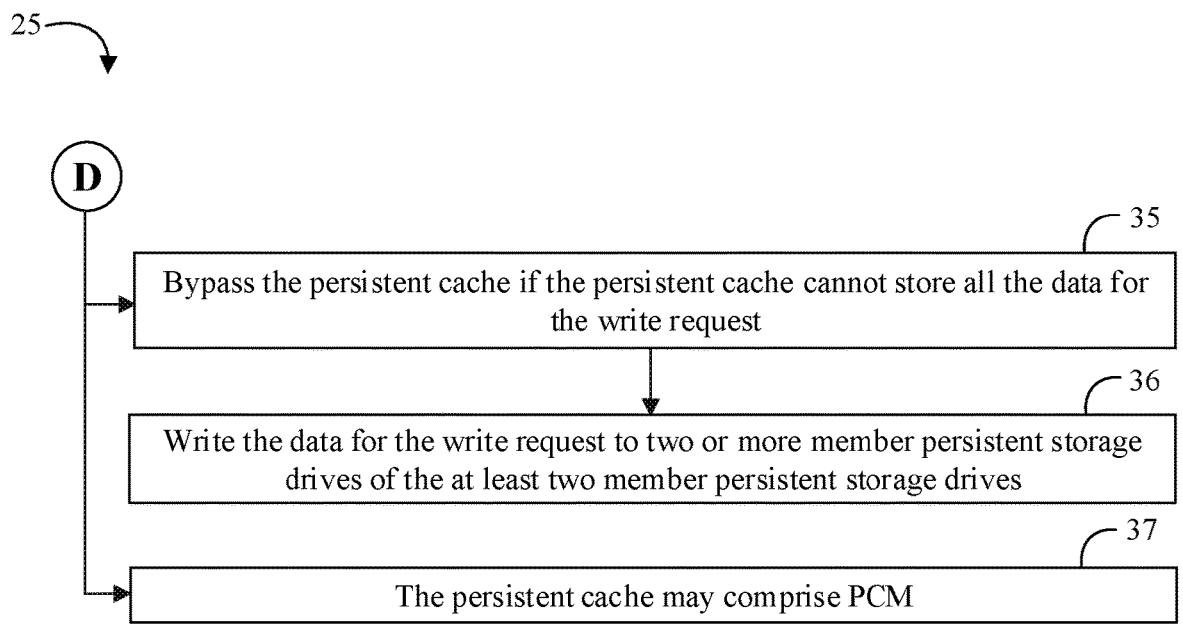

Turning now to FIG. 2, an embodiment of a semiconductor apparatus 20 for use with redundant storage may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to cache all data for a write request for at least two member persistent storage drives in a persistent cache with a write access latency at least as low as a lowest write access latency of the at least two member persistent storage drives, write the data for the write request to one member persistent storage drive of the at least two member persistent storage drives, and indicate that the write request is complete after the data for the write request is redundantly stored in the persistent cache and the one member persistent storage drive. For example, the logic 22 may be further configured to write the data for the write request to the one member persistent storage drive in a striped manner, and/or to set the persistent cache in a write-through mode.

In some embodiments, the logic 22 may also be configured to determine if the at least two member persistent storage drives are idle, and synchronize the data for the write request to another member persistent storage drive of the at least two member persistent storage drives when the at least two member persistent storage drives are determined to be idle. For example, the logic 22 may also be configured to determine if synchronization of the data for the write request is complete, and evict the data for the write request from the persistent cache when the synchronization is determined to be complete. In some embodiments, the logic 22 may be further configured to bypass the persistent cache if the persistent cache cannot store all the data for the write request, and write the data for the write request to two or more member persistent storage drives of the at least two member persistent storage drives. In any of the embodiments herein, the persistent cache may comprise PCM. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 25 (FIGS. 3A to 3D), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Turning now to FIGS. 3A to 3D, an embodiment of a method 25 of controlling redundant storage may include caching all data for a write request for at least two member persistent storage drives in a persistent cache with a write access latency at least as low as a lowest write access latency of the at least two member persistent storage drives at block 26, writing the data for the write request to one member persistent storage drive of the at least two member persistent storage drives at block 27, and indicating that the write request is complete after the data for the write request is redundantly stored in the persistent cache and the one member persistent storage drive at block 28. For example, the method 25 may further include writing the data for the write request to the one member persistent storage drive in a striped manner at block 29, and/or setting the persistent cache in a write-through mode at block 30.

Some embodiments of the method 25 may further include determining if the at least two member persistent storage drives are idle at block 31, and synchronizing the data for the write request from the persistent cache to another member persistent storage drive of the at least two member persistent storage drives when the at least two member persistent storage drives are determined to be idle at block 32. For example, the method 25 may further include determining if synchronization of the data for the write request is complete at block 33, and evicting the data for the write request from the persistent cache when the synchronization is determined to be complete at block 34. Some embodiments of the method 25 may further include bypassing the persistent cache if the persistent cache cannot store all the data for the write request at block 35, and writing the data for the write request to two or more member persistent storage drives of the at least two member persistent storage drives at block 36. In any of the embodiments herein, the persistent cache may comprise PCM at block 37.

Embodiments of the method 25 may be implemented in a system, apparatus, computer, device, etc., for example, such as those described herein. More particularly, hardware implementations of the method 25 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 25 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 25 may be implemented on a computer readable medium as described in connection with Examples 23 to 29 below. Embodiments or portions of the method 25 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide write input/output (I/O) latency improvement while maintaining mirroring RAID data redundancy using persistent cache. RAID levels that use data mirroring in order to provide redundancy, such as RAID1 and RAID10, suffer from an increased latency factor. The same data needs to be written on multiple devices and the global request is not reported as completed until the slowest member completes its write request. Some embodiments may advantageously provide technology to improve the latency of such RAID configurations (e.g., even beyond a single drive latency) while keeping full data redundancy (e.g., for user data reliability).

Some embodiments may provide technology to cache all writes on a device with latency lower than the RAID members (e.g., utilizing INTEL OPTANE DC persistent memory cache for NAND SSD RAID1) and write the data only to one of member drives in a striped manner (e.g., odd chunks are written to odd member drive(s), even chunks are written to even member drive(s)). In some embodiments, the cache may need to be set in a write-through mode. When the RAID array goes idle, the data may be synchronized across members, and after the synchronization is complete the cache can be evicted. Advantageously, in some embodiments, latency is improved because data is written only to one drive instead of two, and data redundancy is maintained because there are always two copies of the data (e.g., one copy in persistent cache, and one copy on a member drive).

Figure 4:
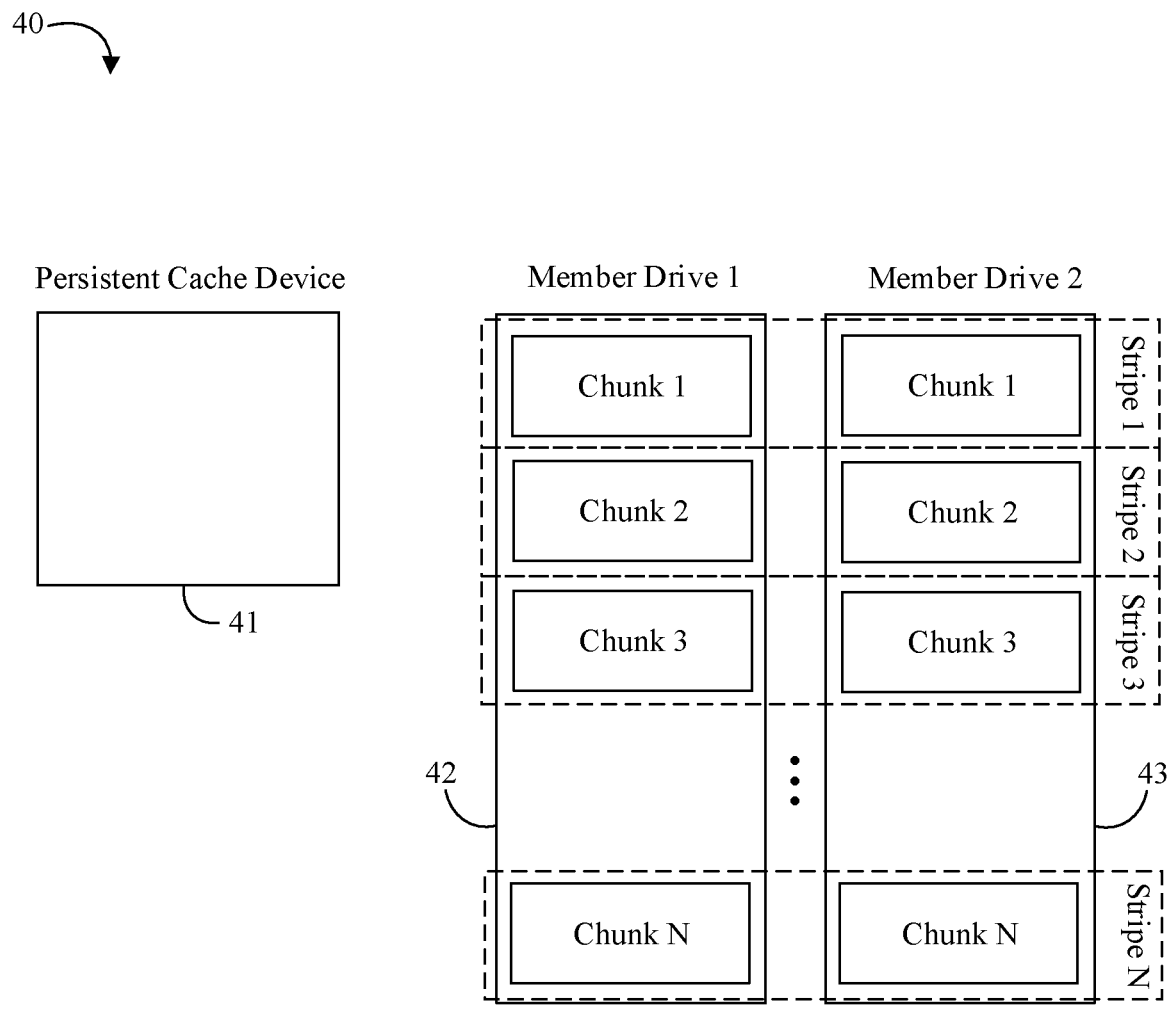
FIG. 4 is a block diagram of an example of an electronic redundant storage system showing an example array data layout according to an embodiment.
Figure 5:
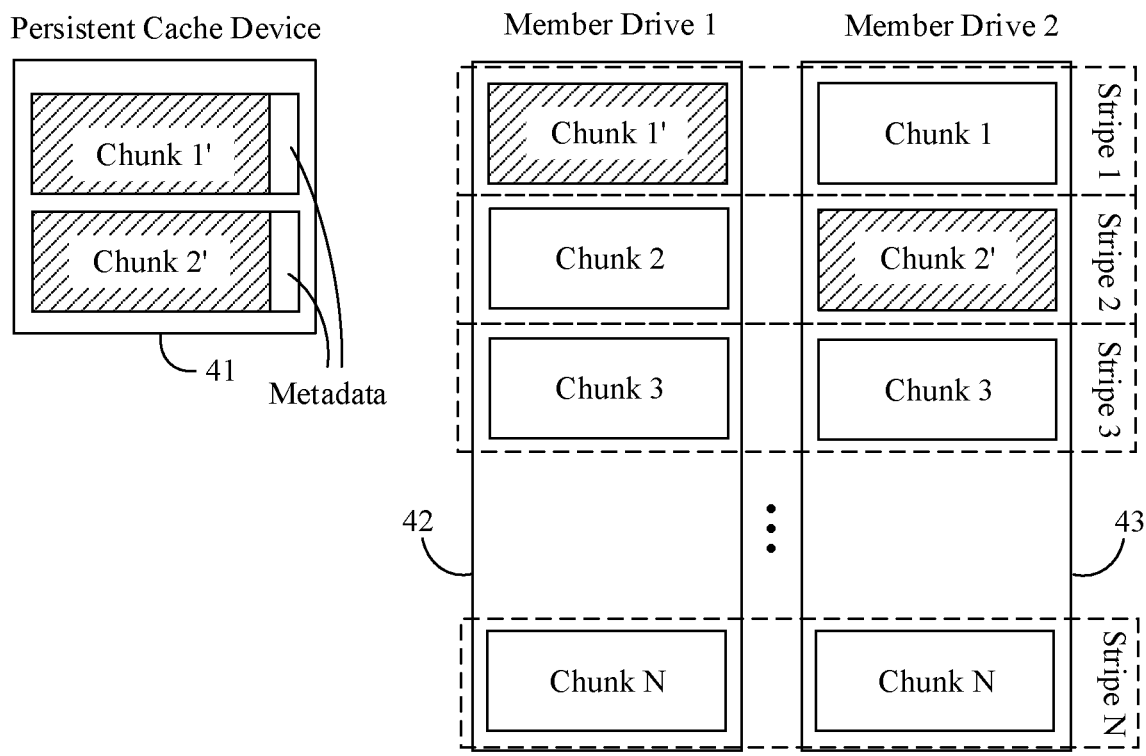
FIG. 5 is a block diagram of the electronic redundant storage system from FIG. 4 showing an example array write pattern according to an embodiment.
Figure 6:
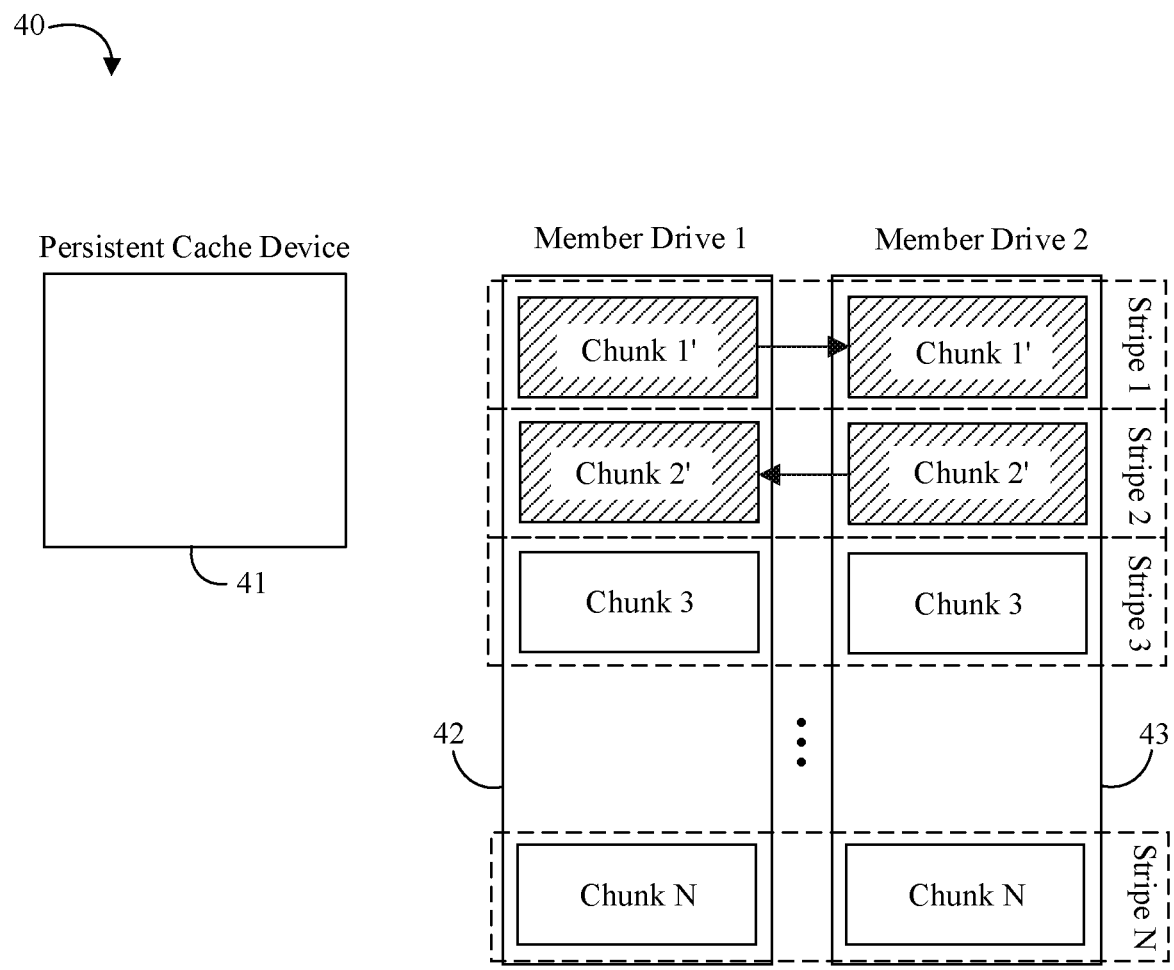
FIG. 6 is a block diagram of the electronic redundant storage system from FIG. 4 showing an example array data layout after synchronization according to an embodiment.

Turning now to FIGS. 4 to 6, an embodiment of an electronic redundant storage system 40 includes a persistent cache device 41, a first member drive 42 (Member Drive 1), and a second member drive 43 (Member Drive 2) communicatively coupled to each other via suitable channels/busses/interfaces/controllers/etc. The system 40 may be configured as a RAID array with data mirroring combined with the persistent cache device 41. The two (2) disk RAID1 configuration described in connection with FIGS. 4 to 6 is only an example, and numerous other configurations with different numbers of drives and RAID configurations will occur to those skilled in the art given the benefit of the present application.

With reference to FIG. 4, an example array data layout shows the RAID array divided into logical stripes with fixed size. The stripe size will indicate the pattern in which data is distributed across both member drives 42, 43. After a host/application/agent issues a write request to the RAID array, the entire data from the request is cached in the persistent cache device 41. In addition, metadata corresponding to the request is written to the persistent cache device 41. The metadata contains information about the sectors that are being written.

With reference to FIG. 5, an example array write pattern shows how the write request may be handled in a striped manner. The RAID engine issues write requests to the member drives 42, 43 in a certain pattern. The drives, chunks, and stripes may be nominally designated as 'even' or 'odd' (e.g., or some other designation may be used to support striping). For example, member drive 42 may be designated as 'Member Drive 1' which is an odd number, while member drive 43 may be designated as 'Member Drive 2' which is an even number. The chunks and stripes may also have associated numbers which are either even or odd (e.g., Chunk 1, Chunk 2, etc., Stripe 1, Stripe 2, etc.). If the write request hits an odd stripe, the RAID engine issues the write request to only an odd member drive (e.g., Member Drive 1). If the write request is related to an even stripe, the RAID engine issues the write request to only an even member (e.g., Member Drive 2). If the write request is bigger than one chunk, the write request is divided into separate requests with parts that hit even and odd stripes. After the data is written to the persistent cache device and one member drive, the request is returned as completed (e.g., without writing the data to the other member drive), advantageously reducing latency.

At a certain point in time including, for example, if the RAID array activity becomes idle, the RAID engine synchronizes the data on the member drives 42, 43. The synchronization may be performed in several steps including: 1) Read the metadata from the persistent cache device 41 to get the list of written sectors; 2) Based on the sector, calculate the stripe number; 3) If the stripe number is even, read the data from an even member and write the data to an odd member drive; and 4) If the stripe number is odd, read the data from an odd member and write the data to an even member drive.

With reference to FIG. 6, an example array data layout after synchronization shows that, after the data is synchronized between odd and even member drives, the persistent cache device 41 can be evicted (e.g., the data can be evicted from the persistent cache device 41 after successful synchronization on the two member drives 42, 43). If the persistent cache device 41 becomes full before the RAID array becomes idle, the RAID array can switch its behavior to a standard RAID1 (e.g., skipping the persistent cache device 41 and issuing the write request to both member drives 42, 43).

Advantageously, data redundancy is maintained at all times while reducing latency. For a Member Drive failure, data which is not synchronized on a remaining member drive is up-to-date in the persistent cache device 41. For a failure of the persistent cache device 41, even stripes are up-to-date on even member drives, odd stripes are up-to-date on odd member drives. If a failure of the persistent cache device 41 is detected, the RAID engine may perform synchronization between all of the RAID member drives.

Without being limited to theory of operation or specific implementations, the biggest latency improvement for some embodiments may be observed for write operations where the size of the write is a multiple of a chunk size. In these cases, the write request is distributed across two drives and executed in parallel. In some embodiments, latency improvement may also be observed for workloads with write bursts (e.g., write I/O with idle or read only time periods). For the persistent cache, any device having latency lower than the RAID member drives may be suitable (e.g. INTEL OPTANE DC Persistent Memory for the cache and NAND SSD RAID, INTEL OPTANE SSD for the cache and NAND SSD RAID, NAND SSD for the cache and hard disk drive (HDD) RAID, etc.).

For sequential I/O, the example data layouts of FIGS. 4 to 6 may disturb the sequential nature of the I/O from the RAID member drive perspective. In order to maintain the sequential nature of the I/O, some embodiments may utilize far data layout of RAID combined with a persistent cache. In the far data layout, data is distributed in such a way that the persistent cache features described herein may be utilized to reduce latency without disturbing the sequential nature of the I/O.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
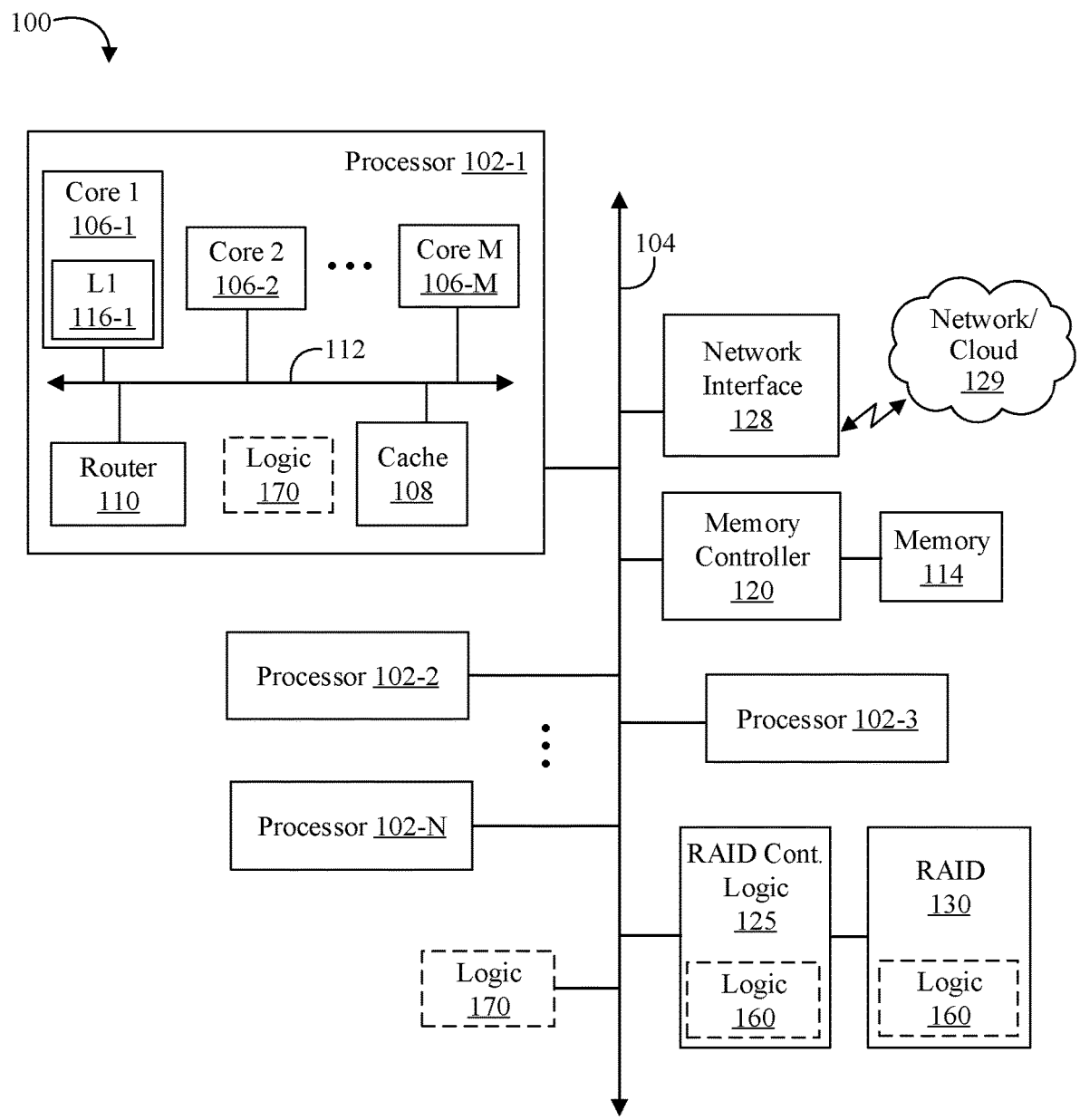
FIG. 7 is a block diagram of an example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a redundant storage device such as a RAID device 130 coupled to the interconnect 104 via RAID controller logic 125. Hence, logic 125 may control access by various components of system 100 to the RAID device 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 8) or provided on a same integrated circuit (IC) device in various embodiments (e.g., on the same circuit board device as the RAID device 130 or in the same enclosure as the RAID device 130).

Furthermore, logic 125 and/or RAID device 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, RAID device 130, SSD bus, SATA bus, logic 125, logic 160, etc., to sense variations in various factors affecting power/thermal behavior of the system/platform, such as temperature, operating frequency, operating voltage, power consumption, and/or inter-core communication activity, etc.

Figure 8:
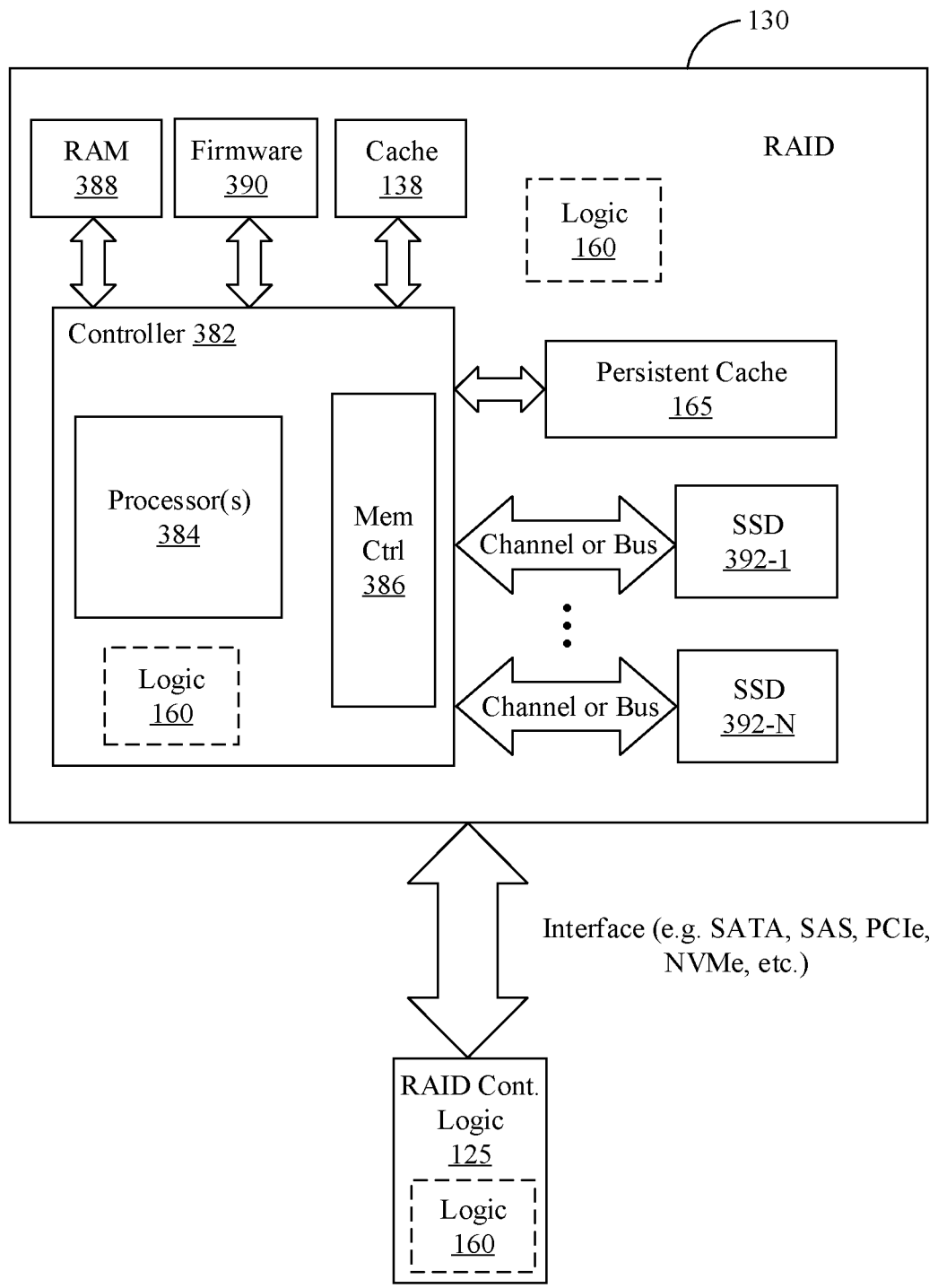
FIG. 8 is a block diagram of an example of a RAID device according to an embodiment.

FIG. 8 illustrates a block diagram of various components of the RAID device 130, according to an embodiment. As illustrated in FIG. 8, logic 160 may be located in various locations such as inside the RAID device 130 or controller 382, etc., and may include similar technology as discussed in connection with FIG. 7. The RAID device 130 includes a controller 382 (which in turn includes one or more processor cores or processors 384 and memory controller logic 386), cache 138, RAM 388, firmware storage 390, and one or more member SSDs 392-1 to 392-N (collectively member SSDs 392, which may include NAND flash, NOR flash, or other types of non-volatile memory). The member SSDs 392 are coupled to the memory controller logic 386 via one or more memory channels or busses. The RAID device 130 further include persistent cache 165 coupled to the memory controller logic 386 via a memory channel or bus. Also, RAID device 130 communicates with logic 125 via an interface (such as a SATA, SAS, PCIe, NVMe, etc., interface). One or more of the features/aspects/operations discussed with reference to FIGS. 1-6 may be performed by one or more of the components of FIG. 8. Processors 384 and/or controller 382 may compress/decompress (or otherwise cause compression/decompression of) data written to or read from member SSDs 392-1 to 392-N. Also, one or more of the features/aspects/operations of FIGS. 1-6 may be programmed into the firmware 390. Further, RAID controller logic 125 may also include logic 160.

As illustrated in FIGS. 7 and 8, the RAID device 130 may include logic 160, which may be in the same enclosure as the RAID device 130 and/or fully integrated on a printed circuit board (PCB) of the RAID device 130. The system 100 may include further logic 170 outside of the RAID device 130. Advantageously, the logic 160 and/or logic 170 may include technology to implement one or more aspects of the method 25 (FIGS. 3A to 3D), the system 40, and/or any of the redundant storage features discussed herein. For example, the logic 170 may include technology to implement the host device/computer system/agent aspects of the various embodiments described herein (e.g., requesting information from the RAID device 130, sending information to the RAID device 130, etc.). For example, the logic 160 may include technology to cache all data for a write request for the RAID device 130 in the persistent cache 165 (e.g., where the persistent cache 165 provides a write access latency at least as low as a lowest write access latency of any member SSD 392 of the RAID device 130), write the data for the write request to one member SSD 392 of the RAID device 130, and indicate that the write request is complete after the data for the write request is redundantly stored in the persistent cache 165 and the one member SSD 392. For example, the logic 160 may be further configured to write the data for the write request to the one member persistent storage drive in a striped manner, and/or to set the persistent cache in a write-through mode.

In some embodiments, the logic 160 may also be configured to determine if the member SSDs 392 are idle, and synchronize the data for the write request to another member SSD 392 of the RAID device 130 when the member SSDs 392 are determined to be idle. For example, the logic 160 may also be configured to determine if synchronization of the data for the write request is complete, and evict the data for the write request from the persistent cache 165 when the synchronization is determined to be complete. In some embodiments, the logic 160 may be further configured to bypass the persistent cache 165 if the persistent cache 165 cannot store all the data for the write request, and write the data for the write request to two or more member SSDs 392 of the RAID device 130. In any of the embodiments herein, the persistent cache 165 may comprise PCM.

In other embodiments, the RAID device 130 may be replaced with any suitable redundant storage technology/media. Embodiments of the RAID controller logic 125 may also be implemented as software RAID with RAID logic or logic 170 running on a host processor 102. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the RAID device 130 may include two or more types of storage media. For example, the bulk of the storage may be NAND and the persistent cache 165 may further include some faster, smaller granularity accessible (e.g., byte-addressable) NVM such as INTEL 3DXP media. The persistent cache 165 may alternatively, or additionally, include persistent volatile memory (e.g., battery or capacitor backed-up DRAM or SRAM). For example, the persistent cache 165 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent cache 165. As shown in FIG. 7, features or aspects of the logic 160 and/or the logic 170 may be distributed throughout the system 100, and/or co-located/integrated with various components of the system 100.

Additional Notes and Examples

Example 1 includes a semiconductor apparatus for use with redundant storage, comprising one or more substrates, and logic coupled to the one or more substrates, wherein the logic is at least partly implemented in one or more of configurable logic and fixed-functionality hardware logic, the logic coupled to the one or more substrates to cache all data for a write request for at least two member persistent storage drives in a persistent cache with a write access latency at least as low as a lowest write access latency of the at least two member persistent storage drives, write the data for the write request to one member persistent storage drive of the at least two member persistent storage drives, and indicate that the write request is complete after the data for the write request is redundantly stored in the persistent cache and the one member persistent storage drive.

Example 2 includes the apparatus of Example 1, wherein the logic is further to write the data for the write request to the one member persistent storage drive in a striped manner.

Example 3 includes the apparatus of any of Examples 1 to 2, wherein the logic is further to set the persistent cache in a write-through mode.

Example 4 includes the apparatus of Example any of Examples 1 to 3, wherein the logic is further to determine if the at least two member persistent storage drives are idle, and synchronize the data for the write request from the persistent cache to another member persistent storage drive of the at least two member persistent storage drives when the at least two member persistent storage drives are determined to be idle.

Example 5 includes the apparatus of Example 4, wherein the logic is further to determine if synchronization of the data for the write request is complete, and evict the data for the write request from the persistent cache when the synchronization is determined to be complete.

Example 6 includes the apparatus of any of Examples 1 to 5, wherein the logic is further to bypass the persistent cache if the persistent cache cannot store all the data for the write request, and write the data for the write request to two or more member persistent storage drives of the at least two member persistent storage drives.

Example 7 includes the apparatus of any of Examples 1 to 6, wherein the persistent cache comprises phase change memory.

Example 8 includes the apparatus of any of Examples 1 to 7, wherein the logic coupled to the one or more substrates includes transistor channel regions that are positioned within the one or more substrates.

Example 9 includes an electronic redundant storage system, comprising at least two member persistent storage drives, persistent cache communicatively coupled to the at least two member persistent storage drives, the persistent cache with a write access latency at least as low as a lowest write access latency of the at least two member persistent storage drives, and a controller communicatively coupled to the persistent cache and the at least two member persistent storage drives, the controller including logic to cache all data for a write request for the at least two member persistent storage drives in the persistent cache, write the data for the write request to one member persistent storage drive of the at least two member persistent storage drives, and indicate that the write request is complete after the data for the write request is redundantly stored in the persistent cache and the one member persistent storage drive.

Example 10 includes the system of Example 9, wherein the logic is further to write the data for the write request to the one member persistent storage drive in a striped manner.

Example 11 includes the system of any of Examples 9 to 10, wherein the logic is further to set the persistent cache in a write-through mode.

Example 12 includes the system of any of Examples 9 to 11, wherein the logic is further to determine if the at least two member persistent storage drives are idle, and synchronize the data for the write request from the persistent cache to another member persistent storage drive of the at least two member persistent storage drives when the at least two member persistent storage drives are determined to be idle.

Example 13 includes the system of Example 12, wherein the logic is further to determine if synchronization of the data for the write request is complete, and evict the data for the write request from the persistent cache when the synchronization is determined to be complete.

Example 14 includes the system of any of Examples 9 to 13, wherein the logic is further to bypass the persistent cache if the persistent cache cannot store all the data for the write request, and write the data for the write request to two or more member persistent storage drives of the at least two member persistent storage drives.

Example 15 includes the system of any of Examples 9 to 14, wherein the persistent cache comprises phase change memory.

Example 16 includes a method of controlling redundant storage, comprising caching all data for a write request for at least two member persistent storage drives in a persistent cache with a write access latency at least as low as a lowest write access latency of the at least two member persistent storage drives, writing the data for the write request to one member persistent storage drive of the at least two member persistent storage drives, and indicating that the write request is complete after the data for the write request is redundantly stored in the persistent cache and the one member persistent storage drive.

Example 17 includes the method of Example 16, further comprising writing the data for the write request to the one member persistent storage drive in a striped manner.

Example 18 includes the method of any of Examples 16 to 17, further comprising setting the persistent cache in a write-through mode.

Example 19 includes the method of any of Examples 16 to 18, further comprising determining if the at least two member persistent storage drives are idle, and synchronizing the data for the write request from the persistent cache to another member persistent storage drive of the at least two member persistent storage drives when the at least two member persistent storage drives are determined to be idle.

Example 20 includes the method of Example 19, wherein the logic is further to determining if synchronization of the data for the write request is complete, and evicting the data for the write request from the persistent cache when the synchronization is determined to be complete.

Example 21 includes the method of any of Examples 16 to 20, further comprising bypassing the persistent cache if the persistent cache cannot store all the data for the write request, and writing the data for the write request to two or more member persistent storage drives of the at least two member persistent storage drives.

Example 22 includes the method of any of Examples 16 to 21, wherein the persistent cache comprises phase change memory.

Example 23 includes at least one computer readable storage medium, comprising a set of instructions, which when executed by a computing device, cause the computing device to cache all data for a write request for at least two member persistent storage drives in a persistent cache with a write access latency at least as low as a lowest write access latency of the at least two member persistent storage drives, write the data for the write request to one member persistent storage drive of the at least two member persistent storage drives, and indicate that the write request is complete after the data for the write request is redundantly stored in the persistent cache and the one member persistent storage drive.

Example 24 includes the at least one computer readable storage medium of Example 23, comprising a further set of instructions, which when executed by the computing device, cause the computing device to write the data for the write request to the one member persistent storage drive in a striped manner.

Example 25 includes the at least one computer readable storage medium of any of Examples 23 to 24, comprising a further set of instructions, which when executed by the computing device, cause the computing device to set the persistent cache in a write-through mode.

Example 26 includes the at least one computer readable storage medium of any of Examples 23 to 25, comprising a further set of instructions, which when executed by the computing device, cause the computing device to determine if the at least two member persistent storage drives are idle, and synchronize the data for the write request from the persistent cache to another member persistent storage drive of the at least two member persistent storage drives when the at least two member persistent storage drives are determined to be idle.

Example 27 includes the at least one computer readable storage medium of Example 26, comprising a further set of instructions, which when executed by the computing device, cause the computing device to determine if synchronization of the data for the write request is complete, and evict the data for the write request from the persistent cache when the synchronization is determined to be complete.

Example 28 includes the at least one computer readable storage medium of any of Examples 23 to 27, comprising a further set of instructions, which when executed by the computing device, cause the computing device to bypass the persistent cache if the persistent cache cannot store all the data for the write request, and write the data for the write request to two or more member persistent storage drives of the at least two member persistent storage drives.

Example 29 includes the at least one computer readable medium storage medium of any of Examples 23 to 28, wherein the persistent cache comprises phase change memory.

Example 30 includes a redundant storage controller apparatus, comprising means for caching all data for a write request for at least two member persistent storage drives in a persistent cache with a write access latency at least as low as a lowest write access latency of the at least two member persistent storage drives, means for writing the data for the write request to one member persistent storage drive of the at least two member persistent storage drives, and means for indicating that the write request is complete after the data for the write request is redundantly stored in the persistent cache and the one member persistent storage drive.

Example 31 includes the apparatus of Example 30, further comprising means for writing the data for the write request to the one member persistent storage drive in a striped manner.

Example 32 includes the apparatus of any of Examples 30 to 31, further comprising means for setting the persistent cache in a write-through mode.

Example 33 includes the apparatus of any of Examples 30 to 32, further comprising means for determining if the at least two member persistent storage drives are idle, and means for synchronizing the data for the write request from the persistent cache to another member persistent storage drive of the at least two member persistent storage drives when the at least two member persistent storage drives are determined to be idle.

Example 34 includes the apparatus of Example 33, wherein the logic is further to means for determining if synchronization of the data for the write request is complete, and means for evicting the data for the write request from the persistent cache when the synchronization is determined to be complete.

Example 35 includes the apparatus of any of Examples 34 to 34, further comprising means for bypassing the persistent cache if the persistent cache cannot store all the data for the write request, and means for writing the data for the write request to two or more member persistent storage drives of the at least two member persistent storage drives.

Example 36 includes the apparatus of any of Examples 30 to 35, wherein the persistent cache comprises phase change memory.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus for use with redundant storage, comprising:
   one or more substrates; and
   logic coupled to the one or more substrates, wherein the logic is at least partly implemented in one or more of configurable logic and fixed-functionality hardware logic, the logic coupled to the one or more substrates to:
   cache all data for a write request for at least two member persistent storage drives in a persistent cache with a write access latency at least as low as a lowest write access latency of the at least two member persistent storage drives,
   write the data for the write request to one member persistent storage drive of the at least two member persistent storage drives, and
   indicate that the write request is complete after the data for the write request is redundantly stored in the persistent cache and the one member persistent storage drive, wherein operations to write the data and to indicate that the write request is complete are performed without writing the data to any other persistent storage drive than the one member persistent storage drive of the at least two member persistent storage drives.

2. The semiconductor apparatus of claim 1, wherein the logic is further to:
   write the data for the write request to the one member persistent storage drive in a striped manner.

3. The semiconductor apparatus of claim 1, wherein the logic is further to:
   set the persistent cache in a write-through mode.

4. The semiconductor apparatus of claim 1, wherein the logic is further to:
   determine if the at least two member persistent storage drives are idle; and
   synchronize the data for the write request from the persistent cache to another member persistent storage drive of the at least two member persistent storage drives when the at least two member persistent storage drives are determined to be idle.

5. The semiconductor apparatus of claim 4, wherein the logic is further to:
   determine if synchronization of the data for the write request is complete; and
   evict the data for the write request from the persistent cache when the synchronization is determined to be complete.

6. The semiconductor apparatus of claim 1, wherein the logic is further to:
   bypass the persistent cache if the persistent cache cannot store all the data for the write request; and
   write the data for the write request to two or more member persistent storage drives of the at least two member persistent storage drives.

7. The semiconductor apparatus of claim 1, wherein the logic coupled to the one or more substrates includes transistor channel regions that are positioned within the one or more substrates.

8. An electronic redundant storage system, comprising:
   at least two member persistent storage drives;
   persistent cache communicatively coupled to the at least two member persistent storage drives, the persistent cache with a write access latency at least as low as a lowest write access latency of the at least two member persistent storage drives; and
   a controller communicatively coupled to the persistent cache and the at least two member persistent storage drives, the controller including logic to:
   cache all data for a write request for the at least two member persistent storage drives in the persistent cache,
   write the data for the write request to one member persistent storage drive of the at least two member persistent storage drives, and
   indicate that the write request is complete after the data for the write request is redundantly stored in the persistent cache and the one member persistent storage drive, wherein operations to write the data and to indicate that the write request is complete are performed without writing the data to any other persistent storage drive than the one member persistent storage drive of the at least two member persistent storage drives.

9. The electronic redundant storage system of claim 8, wherein the logic is further to:
   write the data for the write request to the one member persistent storage drive in a striped manner.

10. The electronic redundant storage system of claim 8, wherein the logic is further to:
    set the persistent cache in a write-through mode.

11. The electronic redundant storage system of claim 8, wherein the logic is further to:
    determine if the at least two member persistent storage drives are idle; and
    synchronize the data for the write request from the persistent cache to another member persistent storage drive of the at least two member persistent storage drives when the at least two member persistent storage drives are determined to be idle.

12. The electronic redundant storage system of claim 11, wherein the logic is further to:
    determine if synchronization of the data for the write request is complete; and
    evict the data for the write request from the persistent cache when the synchronization is determined to be complete.

13. The electronic redundant storage system of claim 8, wherein the logic is further to:
    bypass the persistent cache if the persistent cache cannot store all the data for the write request; and
    write the data for the write request to two or more member persistent storage drives of the at least two member persistent storage drives.

14. The electronic redundant storage system of claim 8, wherein the persistent cache comprises phase change memory.

15. A method of controlling redundant storage, comprising:
- caching all data for a write request for at least two member persistent storage drives in a persistent cache with a write access latency at least as low as a lowest write access latency of the at least two member persistent storage drives;
- writing the data for the write request to one member persistent storage drive of the at least two member persistent storage drives; and
- indicating that the write request is complete after the data for the write request is redundantly stored in the persistent cache and the one member persistent storage drive, wherein operations to write the data and to indicate that the write request is complete are performed without writing the data to any other persistent storage drive than the one member persistent storage drive of the at least two member persistent storage drives.

16. The method of claim 15, further comprising:
- writing the data for the write request to the one member persistent storage drive in a striped manner.

17. The method of claim 15, further comprising:
- setting the persistent cache in a write-through mode.

18. The method of claim 15, further comprising:
- determining if the at least two member persistent storage drives are idle; and
- synchronizing the data for the write request from the persistent cache to another member persistent storage drive of the at least two member persistent storage drives when the at least two member persistent storage drives are determined to be idle.

19. The method of claim 18, further comprising:
- determining if synchronization of the data for the write request is complete; and
- evicting the data for the write request from the persistent cache when the synchronization is determined to be complete.

20. The method of claim 15, further comprising:
- bypassing the persistent cache if the persistent cache cannot store all the data for the write request; and
- writing the data for the write request to two or more member persistent storage drives of the at least two member persistent storage drives.

* * * * *